US006644519B2

(12) United States Patent
Last

(10) Patent No.: US 6,644,519 B2
(45) Date of Patent: Nov. 11, 2003

(54) CLOSABLE CONTAINER, AND METHODS FOR FILLING CONTAINERS

(75) Inventor: Laurens Last, Monte Carlo (MC)

(73) Assignee: Itasac N.V., Curacao (AN)

( * ) Notice: Subject to any disclaimer, the term of this patent is extended or adjusted under 35 U.S.C. 154(b) by 0 days.

(21) Appl. No.: 10/000,199

(22) Filed: Nov. 2, 2001

(65) Prior Publication Data

US 2002/0092867 A1 Jul. 18, 2002

Related U.S. Application Data

(63) Continuation of application No. PCT/NL00/00291, filed on May 4, 2000.

(30) Foreign Application Priority Data

May 4, 1999 (NL) .............................................. 1011960

(51) Int. Cl.[7] .............................................. B65D 25/40
(52) U.S. Cl. ...................... 222/570; 383/80; 383/904; 141/351
(58) Field of Search .......................... 222/570; 383/80, 383/906, 904, 96; 141/351, 352, 292

(56) References Cited

U.S. PATENT DOCUMENTS

| | | | | |
|---|---|---|---|---|
| 2,485,996 A | * | 10/1949 | Atkins ......................... 383/96 |
| 3,245,587 A | | 4/1966 | Brown et al. |
| 3,759,429 A | | 9/1973 | Ardito et al. |
| 3,768,501 A | * | 10/1973 | Elson et al. ................. 137/231 |
| 4,375,864 A | * | 3/1983 | Savage ......................... 222/81 |
| 4,445,551 A | | 5/1984 | Bond et al. |
| RE32,354 E | * | 2/1987 | Savage ......................... 222/81 |
| 4,696,411 A | * | 9/1987 | Graf et al. ................... 220/281 |
| 5,041,267 A | * | 8/1991 | Randtke et al. ............. 422/102 |
| 5,425,465 A | * | 6/1995 | Healy .......................... 215/355 |
| 5,566,729 A | * | 10/1996 | Grabenkort et al. .......... 141/25 |
| 5,609,195 A | * | 3/1997 | Stricklin et al. ............ 141/346 |
| 5,694,991 A | * | 12/1997 | Harris et al. ................ 141/346 |
| 5,878,798 A | * | 3/1999 | Harris et al. ................ 141/346 |
| 5,975,164 A | * | 11/1999 | Whaley et al. ............. 141/351 |
| 5,996,653 A | * | 12/1999 | Piccinino, Jr. .............. 141/346 |
| 6,039,301 A | * | 3/2000 | Westerhof .................... 251/144 |
| 6,394,992 B1 | * | 5/2002 | Sjoholm ..................... 604/411 |

FOREIGN PATENT DOCUMENTS

| | | |
|---|---|---|
| WO | WO 92/03372 | 3/1992 |
| WO | WO 98/48203 | 10/1998 |
| WO | WO 99/05446 | 2/1999 |

* cited by examiner

*Primary Examiner*—Gene Mancene
*Assistant Examiner*—F. Nicolas
(74) *Attorney, Agent, or Firm*—Michael Best & Friedrich LLP; Teresa J. Welch; Jeffrey D. Peterson

(57) ABSTRACT

A container having a body, a male element, a female element and a plug. The female element comprises a body having an axial bore which extends through the body from an insertion opening outside the container body, to a seat inside the container body. The plug is positioned in the seat of the axial bore to close off the bore. The male element has a closure means and a tubular part which fits into the axial bore. The tubular part has a head and is designed to interact with the plug in order to press the plug off the seat. A passage extends through the tubular part of the male element to the closure means. The container body and the male element are provided with interacting coupling means which provides resistance to the male element being pulled outwards out of the bore.

17 Claims, 12 Drawing Sheets

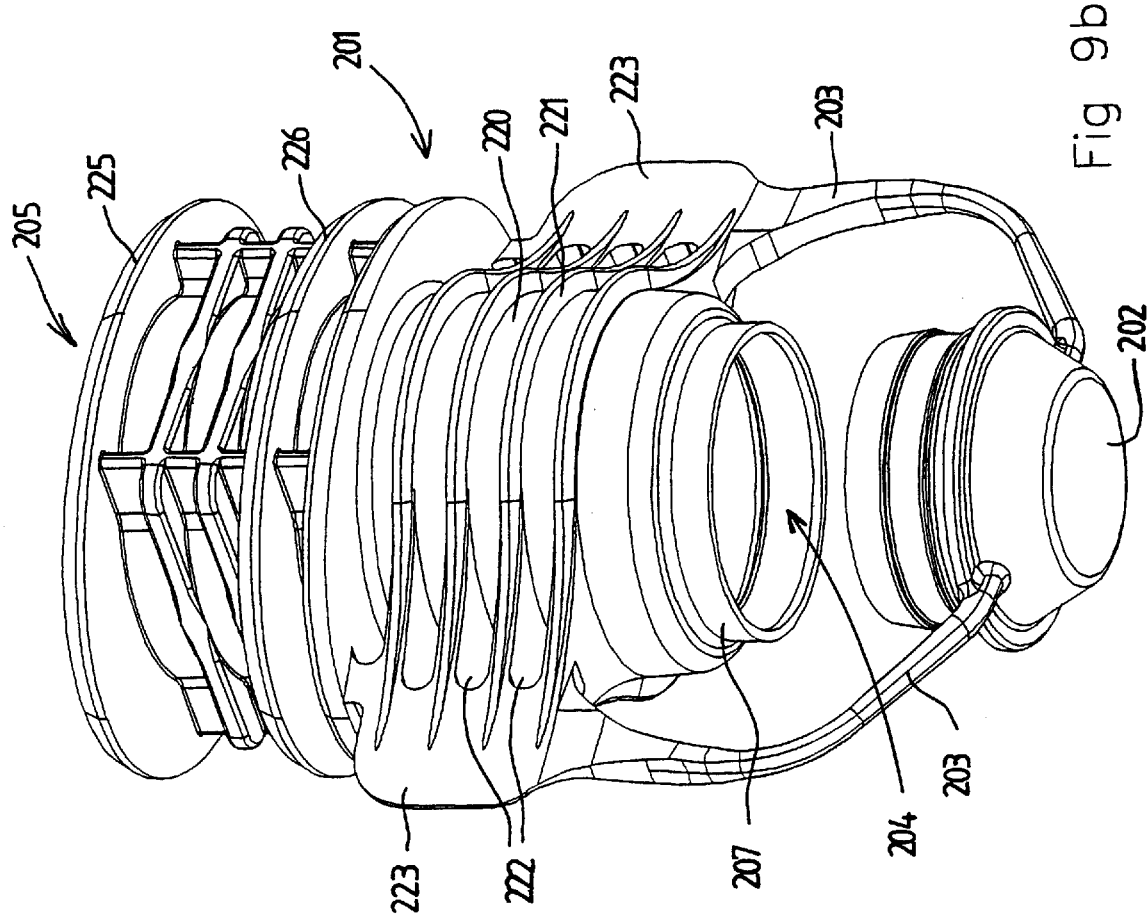
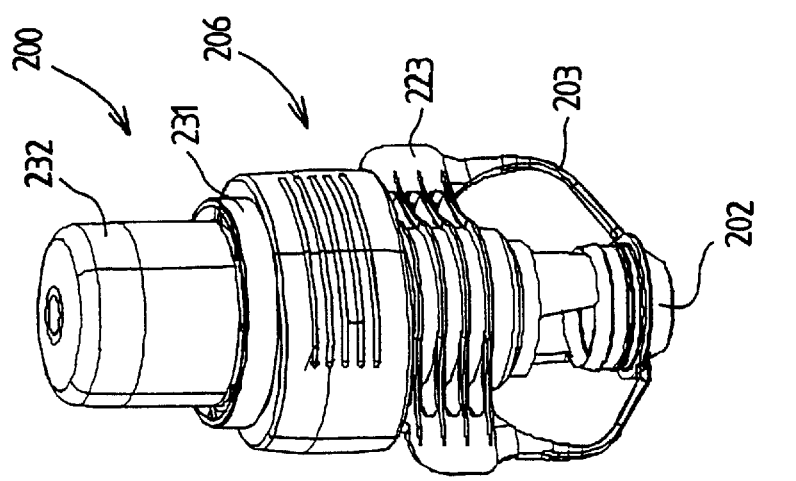
Fig 9b
Fig 9a

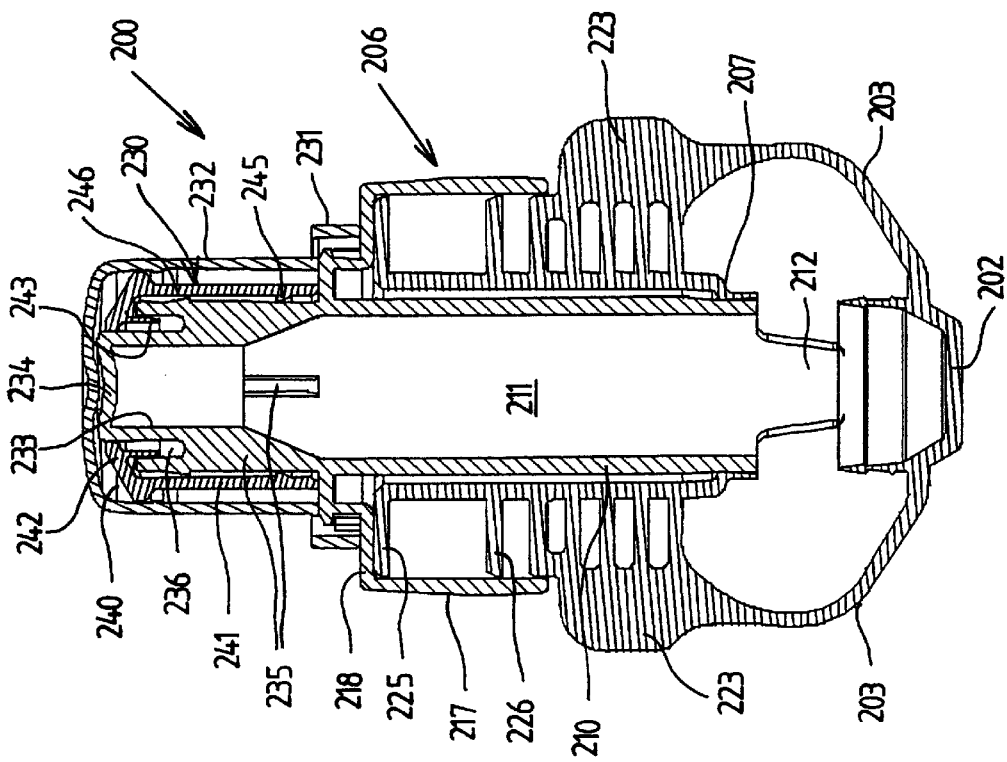
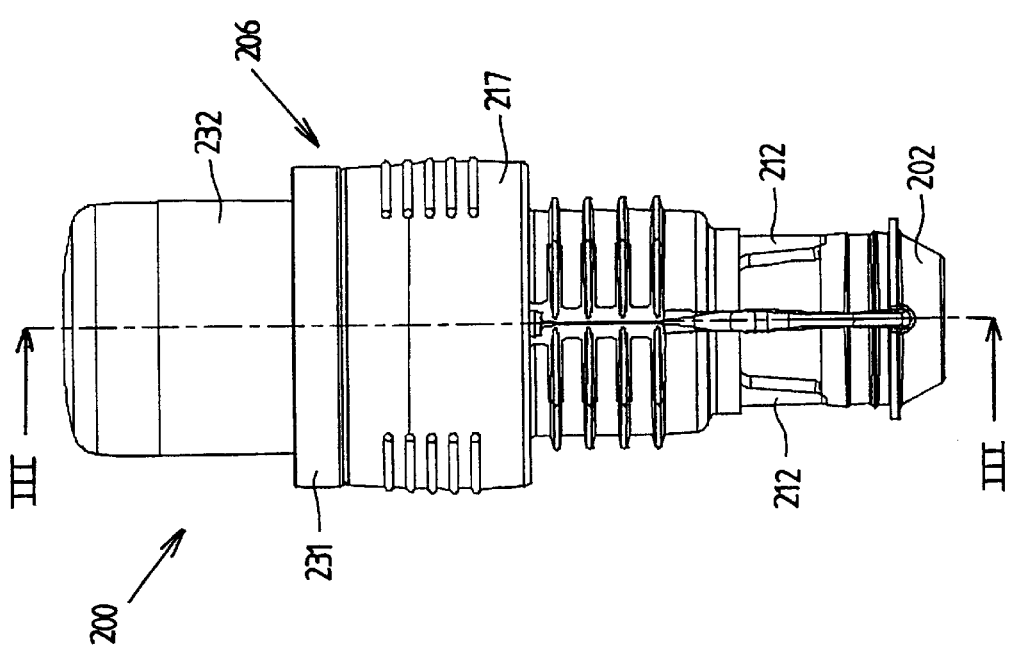

CLOSABLE CONTAINER, AND METHODS FOR FILLING CONTAINERS

CROSS-REFERENCE TO RELATED APPLICATIONS

This is a continuation application of PCT/NL00/00291 filed May 4, 2000, which PCT application claims the priority of NL 1011960 filed May 4, 1999 herein incorporated by reference.

FIELD OF THE INVENTION

A first aspect of the present invention relates to a container with a closable opening, comprising a container body which is formed by a wall, which container furthermore comprises an assembly for providing a closable communication with the interior of the container body, which assembly comprises a female element which is secured in the wall of the container body, as well as a male element and a plug.

The female element has a body which is secured in the wall of the container body, with an axial bore which extends through the body, from an insertion opening for the male element on the outside to a seat, which extends around the bore, for the plug in the interior of the container body, which plug serves to close off the bore.

The male element has a tubular part which fits into the axial bore, and the male element is provided with a passage which extends through the tubular part and with a head which is able to interact with the plug in order to press the latter off its seat.

The male element furthermore has closure means for closing off the passage.

The first aspect of the invention also relates to an assembly for providing a closable communication with the interior of a container of this nature.

BACKGROUND OF THE INVENTION

A container of the type mentioned above is known, for example, from NL 1006636. In this known container, the container body is designed as a flexible plastic bag which may be filled with one filling medium or another, for example a liquid or powder substance. However, the first aspect of the invention is not limited to containers with a flexible container body. By way of example, the container body may have a stable wall, for example a (plastic) bottle, which is filled, for example, with a carbonated beverage.

In the case of the container shown in FIGS. 8a–d of NL 1006636, the head of the male element is coupled to the plug. After the blocking ring has been removed, the male element can be pressed towards the body of the female element, so that the plug is pressed out of its seat. The male element is provided with a so-called flip-flop cap, by means of which the passage in the male element can be closed off. The container therefore has, as it were, two components for closing off the interior of the container from the outside world, i.e. the plug in the interior of the container and the closure means which are arranged on the male element on the outside of the container. In the design shown, the closure means not only fulfil the function of closing off the passage in the male element, but also have a metering function when the container is used.

A second aspect of the invention relates to a method for producing a connecting assembly for providing a fluid communication.

A third aspect of the present invention relates to the creation of containers which are filled with a filling medium and have a flexible wall, in particular containers with a container body which is formed by a (plastic) bag.

OBJECT OF THE INVENTION

According to a first object, the present invention aims to propose measures which make it possible to provide containers with a wide variety of assemblies which have a closure and/or metering function.

According to a second object, the invention aims to enable connecting assemblies providing a fluid communication to be produced efficiently.

According to a third object, the invention aims to enable containers which are to be filled with a filling medium and have a flexible wall, in particular containers with a container body which is formed by a (plastic) bag, to be filled efficiently.

According to a fourth object, the invention aims to reduce or eliminate the risk of (bacterial) contamination during or after filling of the containers. In flexible containers, the filling process is of essential import, on the one hand with regard to the economic aspects, such as the capacity with which containers can be filled and the cost price of the containers, and on the other hand with regard to the quality aspects, such as the shelf life of the filled medium and the appearance of the filled container. In particular, the present invention relates to a method for filling a container of this nature under aseptic conditions.

SUMMARY OF THE INVENTION

The first object is achieved by the present invention by the creation of a container which is characterized in that the body and the male element are provided with interacting coupling means which provide a resistance to the male element being pulled outwards out of the bore. In other words, this first aspect of the invention proposes to provide a direct coupling between the male element which fits into the bore and the body of the female element.

This measure provides the option of designing the head of the male element and the plug in such a manner that they no longer couple together, but that the plug can still be pressed out of its seat by the male element. It is then no longer possible for the plug to be pulled back into its seat by the male element, but that is not always necessary, since the closure means of the male element are now available.

Incidentally, the inventive idea still allows the plug to be coupled to the male element, as will be clear from the exemplary embodiments which are to be explained below.

The closure means may be designed in such a manner that they close off the container on only one occasion, so that once the container has been opened it can no longer be closed again using the said closure means. However, the plug can in some events be used to close the container again. Alternatively, the closure means may also be designed to open and close the container repeatedly, for example as a screw cap, twist cap (which opens/closes when rotated through a limited angle), flip-flop cap, push-pull cap, etc., which closure means are already known per se, for example for bottles. In this design, it can be stated that the closure means also have a metering function when the container is used. In yet another embodiment, the closure means may, for example, be designed as a (hand) pump, which pump may be designed as a disposable pump. The closure means could also be designed as a tap. The present invention also provides for the possibility of supplying a single male element in combination with a plurality of filled container bodies; this option is advantageous, for example, for the pump design.

The head of the male element and the plug may be designed in various ways in order thus to obtain various methods of interaction between the said components. In a first variant, the male element can only press the plug out of its seat, and the male element can no longer return the plug into its seat. In this case, there may be provision for the plug to be coupled to the male element in such a manner that the plug remains attached to the head of the male element in the open position. In a second variant, the plug is coupled to the male element in such a manner that the plug can be moved into its seat by moving the male element. This coupling may be permanent, so that once coupling has been brought about it can no longer be disconnected, but the coupling may also be releasable. In this case, the plug is uncoupled from the head of the male element after the plug has been moved out of the open position into its seat. Particularly in the case of the permanent coupling, there may be provision for the container to be placed in an appliance with a mechanism which acts on the male element in order in each case to move the plug out of its seat or move it into its seat.

The coupling means preferably form a stop face on the body of the female element and a stop face on the male element, which stop faces engage behind one another in the coupled state. This is possible with a bayonet coupling or the like, but also with a screw thread coupling or with a resilient gripper edge or resilient lips.

In a preferred embodiment, the coupling means define a plurality of axial positions of the male element with respect to the body of the female element, which positions comprise a first position, in which the plug is located in its seat and the interior of the container is closed off by the plug, and a second position, in which the plug is held away from its seat by the male element and the interior of the container is in communication with the passage in the male element. This measure makes it possible for the male element not yet to be acting on or coupled to the plug, for example in the design in which such coupling is not possible, but for it to be connected to the body via the coupling means, so that it cannot be moved out of the bore unintentionally.

In an advantageous embodiment, there is provision for the coupling means, in the first position, to hold the male element with only a slight resistance and, in the second position, to hold the male element with a considerably greater resistance than in the first position. For example, there is provision for it no longer to be possible, in the second position, to pull the male element out of the bore by hand, while in the first position the male element can be removed with little effort.

Further advantageous embodiments of the container according to the first aspect of the invention are described in the following description.

According to the second aspect of the invention the object is achieved by a method for producing a connecting assembly for providing a fluid communication. The method comprises the injection-moulding of the male element in a mould, which mould has a first mould part, with a mould cavity, which shapes a part of the male element, and with a receiving space for a second mould part which can be placed in the first mould part and shapes that part of the male element which is provided with coupling means.

The third and fourth aspects of the invention relate to methods for providing a flexible container which is filled with a filling medium.

BRIEF DESCRIPTION OF THE DRAWINGS

FIG. 9a diagrammatically depicts a perspective view of another exemplary embodiment of an assembly according to the invention for providing a closable communication with a container body.

FIG. 9b shows a perspective view of the female element and the integrally formed plug of the assembly shown in FIG. 9a.

FIG. 9c shows a side view of the assembly from FIG. 9a.

FIG. 9d shows a cross section on line III—III from FIG. 9c.

FIG. 10b shows a front view of the assembly from FIG. 10a.

DESCRIPTION OF PREFERRED EMBODIMENTS

Figure 1C:
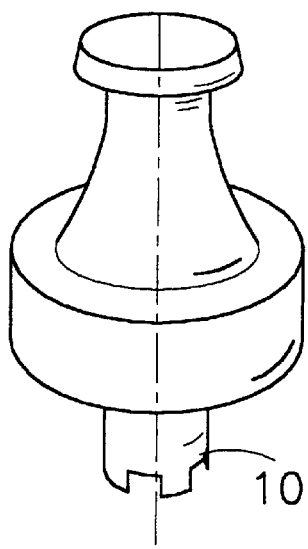
FIGS. 1a, 1b, 1c each show part of a first exemplary embodiment of a container according to the invention, respectively illustrating cross-sectional, side and perspective views of the male element of this container.
Figure 1B:
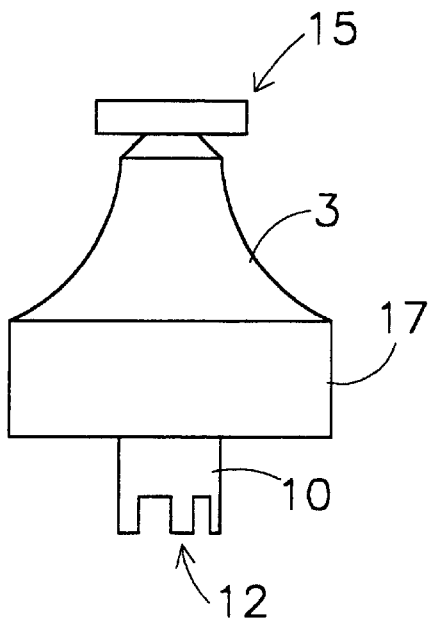
Figure 1A:
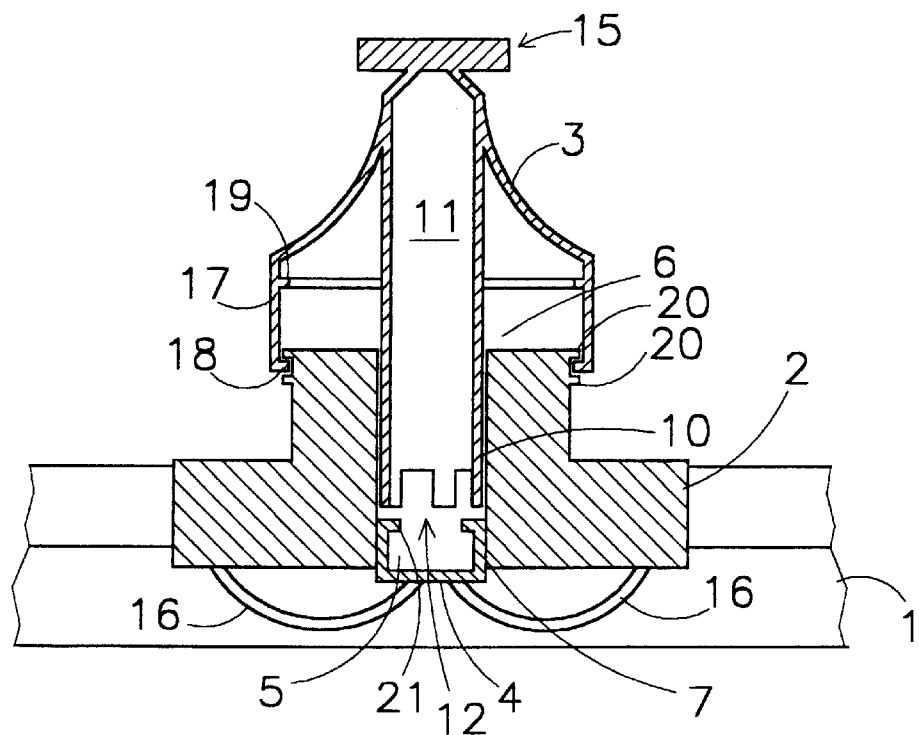

FIG. 1a shows part of a container body 1, which is designed as a bag made from plastic film. The bag may be filled with a number of materials, such as liquids, creams, powders, etc. The container comprises an assembly for providing communication with the interior of the container body 1. The assembly comprises a female element with a relatively rigid plastic body 2, which is produced by injection-moulding, for example, and here is welded securely into one edge of the container body 1.

The assembly furthermore comprises a male element 3 and a plug 4. The female element 2 has an axial bore 5 which extends through the body 1, from an insertion opening 6 for the male element 3 on the outside to a seat 7, which extends around the bore 5, for the plug 4 in the interior of the body of the bag.

When the plug 4 is resting in the seat 7, the bore 5 is closed off from the interior of the container body 1. In this embodiment, the plug 4 is movably connected to the body 2, in this example via arms 16 which are integral with the plug 4 and the body 2.

The male element 2 has a tubular part 10 which fits into the axial bore 5.

The gap between the tubular part of the male element and the body of the female element which is shown in FIG. 1a and the other figures of the drawing is in practice sealed off. For example, a sealing ring (not shown in the drawing) may be arranged on the tubular part 10 or in the axial bore 5. It is also possible for the tubular part to be provided with an axial section which fits tightly into the bore. It is also possible for the tubular part of the male element to be connected in a sealed manner to the seat of the plug, after the plug has been pushed off this seat.

Furthermore, the male element 2 is provided with a passage 11 which extends through the tubular part 10, and with a head 12, which is able to interact with the plug 4 in order to press the latter off its seat 7. Furthermore, the male element 2 also comprises associated closure means 15 for closing off the passage 11 on the outside of the container. In the design illustrated, the head 12 is designed in such a manner that it cannot be coupled to the plug 4.

FIG. 1a shows the male element 3 in a first axial position with respect to the body 2 of the female element. In this first position, the plug 4 is located in its seat 7, and the interior of the container is closed off by the plug 4. It is assumed here that the container has been filled with a material. By way of example, the container has been filled with a beverage and the container is supplied to the consumer with the male element 3 in the first position.

The male element is held in the first position by means of interacting coupling means, which are provided on the body 2 and the male element 3 and provide a resistance to the male element 3 being pulled outwards out of the bore.

The coupling means comprise a collar wall 17 which is formed on the tubular part of the male element 3, has a larger diameter than the tubular part, which collar wall 17 is provided with a click-fit rim 18 in the area of the side facing towards the body 2 and with a second click-fit rim 19 which is further away from the body 2. The body 2 is provided with one or more outwardly projecting stop rims 20.

In the first position shown, the first click-fit rim 18 of the male element 3 engages behind the outer stop rim 20 of the body 2. During assembly, the click-fit rim 18 will pass easily over the said click-fit rim 20.

If the consumer now wishes to consume the beverage, the male element 3 has to be pressed towards the body 2. As a result, the head 12 of the male element 3 comes into contact with the plug 4 and presses the latter out of its seat 7. If the male element 3 has been depressed sufficiently far, the second click-fit rim 19 clicks over the stop rim 20; preferably, this can be heard clearly. Due to the fact that the click-fit rim 19 lies further away from the free edge of the collar wall 17, the said click-fit rim 19 will be more rigid than the click-fit rim 18; in other words, a greater force will be required for the male element 3 to be pulled back out of the bore 5 from the second position than from the first position. In particular, it is not possible for the male element 3, once it has been moved into the second position, to be pulled out of the bore again, without exerting destructive force. This is an automatic signal that the plug 4 of the container has been opened.

However, the contents of the container are still closed off from the outside world, owing to the fact that the closure means 15 are still closed.

In this example, the said closure means 15 comprise a cap, which hermetically seals the axial passage 11 in the male element 3 at its outer end. The cap 15 is connected to the male element 3 via an easily frangible wall, and in particular the cap 15 and the male element 3 are produced as a single unit, with a frangible wall between them, as a plastic injection-moulded product.

The consumer can therefore consume the beverage when the male element 3 has been moved into the second position and the cap 15 has been broken off.

FIG. 1a also shows that the plug 4 has a recess on its side facing towards the insertion opening 6 and that an inwardly projecting ridge 21 extends around the said recess. This is because the design is such that it is possible to couple the plug 4 to the head of a filler needle (not shown), which forms part of a filling device for filling the container. Prior to the filling operation, the male element 3 is removed from the bore 5, which requires little force if the coupling between the male element 3 and the body 2 is effected by means of the engagement between the click-fit rim 18 and the stop rim 20.

Then, a filler needle (known per se) is fitted into the bore 5, pressing the plug 4 out of its seat 7 and coupling the plug 4 to the head of the said filler needle. Then, the container is filled. When the container is full, the filler needle is pulled out of the bore 5, so that the plug 4 then moves back into its seat 7 and the container is closed. Finally, the male element 3 is put back in its first position on the body 2.

In particular, it is possible to fill the container with its contents under aseptic or sterile conditions.

In a preferred embodiment, this method comprises the following steps:

applying a vacuum to the container via the bore 5, from which the male element 3 has been removed, the plug 4 sealing the container in a vacuum-tight manner after the vacuum has been applied, placing the male element 3 in the bore in the first position, so that the male element 3 can easily be removed from the body 2 and the plug 4 remains closed, sterilizing the container, to which a vacuum has been applied, with its male element 3 fitted into the bore 5, the sterilization preferably being carried out by means of radiation, for example gamma radiation, placing the container, or at least the section containing the projecting male element 3, in a sterile chamber, removing the male element 3 from the bore 5, with the male element 3 remaining inside the sterile chamber, placing a filler needle of a filler-needle member in the bore 5, which filler needle has a head which can be coupled to the plug 4. In the process, the filler-needle member seals off the bore 5 in the body 2 from the sterile chamber, so that the container to which a vacuum has been applied does not come into contact with the sterile chamber. For example, if there is a separate gas in the chamber, the said gas is prevented from entering the container, pressing the plug 4 off the seat 7 and filling the container body, during which process no air or sterilization gas enters the container, using the filler needle to pull the plug 4 into the seat 7, so that the filled container body is closed off, and then removing the filler-needle member, placing the male element 3 back in the bore 5, in such a manner that the male element moves into the first position, and removing the filled container from the sterile chamber.

The container 1 may be supplied full to the consumer in the state shown in FIG. 1a, for example. To prevent the male element 3 from being moved into the second axial position inadvertently or without authorization, so that the plug 4 moves out of its seat 7, there may be provision for a removable blocking ring to be moulded onto the collar 17 of the male element 3, which blocking ring extends as far as the body 2.

In a variant of the sterilization and filling process described above, there is provision for the male element 3 to be sterilized separately from the container body 1 with the female element 2. In this case, the container body 1 may, for example, first have a vacuum applied to it then be closed off by means of the plug 4. To prevent contamination to the bore 5 following sterilization, there is provision for that side of the said bore 5 which is remote from the seat 7 for the plug 4 to be closed off by means of a closure element. This closure element may, for example, be a loose plug or cap which is attached after the vacuum has been applied to the container, and then the entire assembly is sterilized using (gamma) radiation. It is also possible to arrange a type of film over the opening of the bore, which can preferably be welded to the body 2 around the circumference of the bore 5, and the male element is subsequently inserted through this film.

In this way, a container body can thus be sterilized and stored, transported, etc. in this state. The male element can then be sterilized at a suitable time, for example also using (gamma) radiation or using a different method and can be placed on the container body immediately after the container has been filled in a sterile chamber.

The assembly comprising the body 2 and the plug 4 therefore fulfils an important role in particular during the sterilization and filling process. In particular, air or a sterilization gas or vapour is prevented from entering the container, so that the container can be completely filled. This is advantageous, for example, because if there is no air or gas in the filling medium, the closed container can be heated without problems in a microwave without any excess pressure being built up and/or without first having to open the packaging. This is particularly advantageous for foodstuffs, for example.

During the filling operation, there may be provision, if the container has been virtually completely filled with the filling medium, for an even higher pressure to be applied to the said medium in order, in this way, to stretch the flexible wall of the container, so that the filled and closed container forms a rigid unit. It is also possible for the filling medium to be introduced into the container in the heated state.

Figure 2:
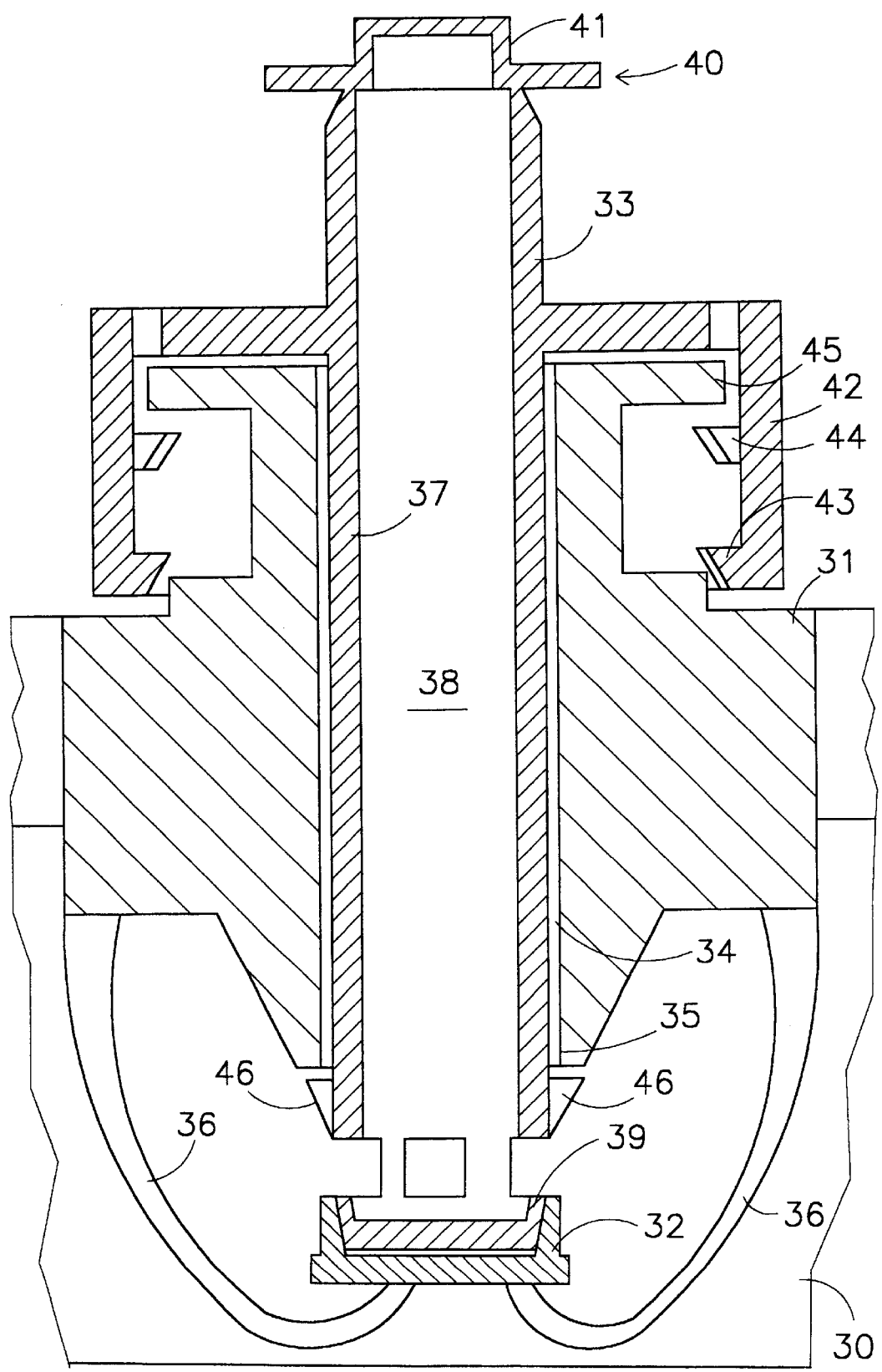
FIG. 2 shows a cross section through part of a second exemplary embodiment of a container according to the invention.

FIG. 2 shows a variant of the container in accordance with FIGS. 1a–c, having a container body 30, for example a bag made from plastic film, and an assembly for providing a closable communication with the interior of the bag.

The assembly is broadly similar to the assembly described above, and only the actual differences will be explained here.

The assembly comprises a female element 31 with a body which is fixed in the bag, a plug 32 and a male element 33. The body 31 is provided with bore 34, and the plug 32 fits into seat 35 of the body 31 so as to form a seal. The plug 32 is movably connected to the body 31, in this example via arms 36.

The male element 33 has a tubular part 37 with a passage 38 which extends through the tubular part 37.

The male element 33 furthermore has a head 39. This head 39 and the plug 32 are designed in such a manner that the plug 32 can be coupled to the head 39, as shown in FIG. 2.

A frangible cap 40 is situated on the outer end of the male element 33. The cap 40 has a projection 41 which makes it possible for the cap 40, together with the said projection, to be positioned in the opening of the male element 33 so as to close off the passage 38 again.

FIG. 2 shows the male element 33 in a second axial position with respect to the body 31 of the female element. In this second position, the plug 32 has been pressed out of its seat 35, and the interior of the container is closed off by the cap 40.

The male element 33 is now held in the second position by means of interacting coupling means which are provided on the body 31 and the male element 33 and which provide a resistance to the male element 33 being pulled outwards out of the bore.

The coupling means comprise a collar wall 42, which is formed on the tubular part of the male element 33 and has a larger diameter, the inside of which is provided with first click-fit fingers 43 in the area of the side facing towards the body 31 and with second click-fit fingers 44 further away from the body 31. The body 31 is provided with a click-fit rim 45 which projects outwards. In the first position, the click-fit fingers 43 engage behind the click-fit rim 45.

The coupling means furthermore comprise one or more hook members 46, which are formed on the tubular body 37 and, in the second position of the male body 33, engage behind an associated plug of the body 31 of the female element. In this example, the said hook members 46 are arranged behind the head 39 of the male element 33, in such a position that the hook members 46 engage behind the seat 35 when the male element 33 is moved into the second position.

In this second position, therefore, the male element 33 is fixed to the body 31 both by the hook members 46 and by the click-fit fingers 44. This attachment is such that, in this second position, the resistance to the male element being pulled out of the bore is so high that the male element 33 can only be pulled out of the bore by the application of destructive forces. Movement into the said second position may be carried out mechanically.

In a variant which is not shown, the male element 3 is fixed to the body only by means of the hook members 46, while in a further variant there is a press fit between the male element and the body.

The container in accordance with FIG. 2 may be supplied in the empty state to a filling/sterilization device, in a state in which the male element 33 is located in the first position and the plug 32 is closing off the container, to which a vacuum may have been applied. Then, for filling purposes, the male element 33 is pulled out of the bore 35, a movement which is easy due to the relatively low resistance provided by the click-fit fingers 43. Then, a suitable filler needle can be used to press the plug 32 out of the seat, and the container can be filled. Then, the filler needle pulls the plug 32 back into the seat 35, so that the container is closed. Then, possibly in a different station in the device, the male element 33 can be fitted into the bore 35 and pressed through sufficiently far to reach the second position, as shown in FIG. 2.

Figure 3:
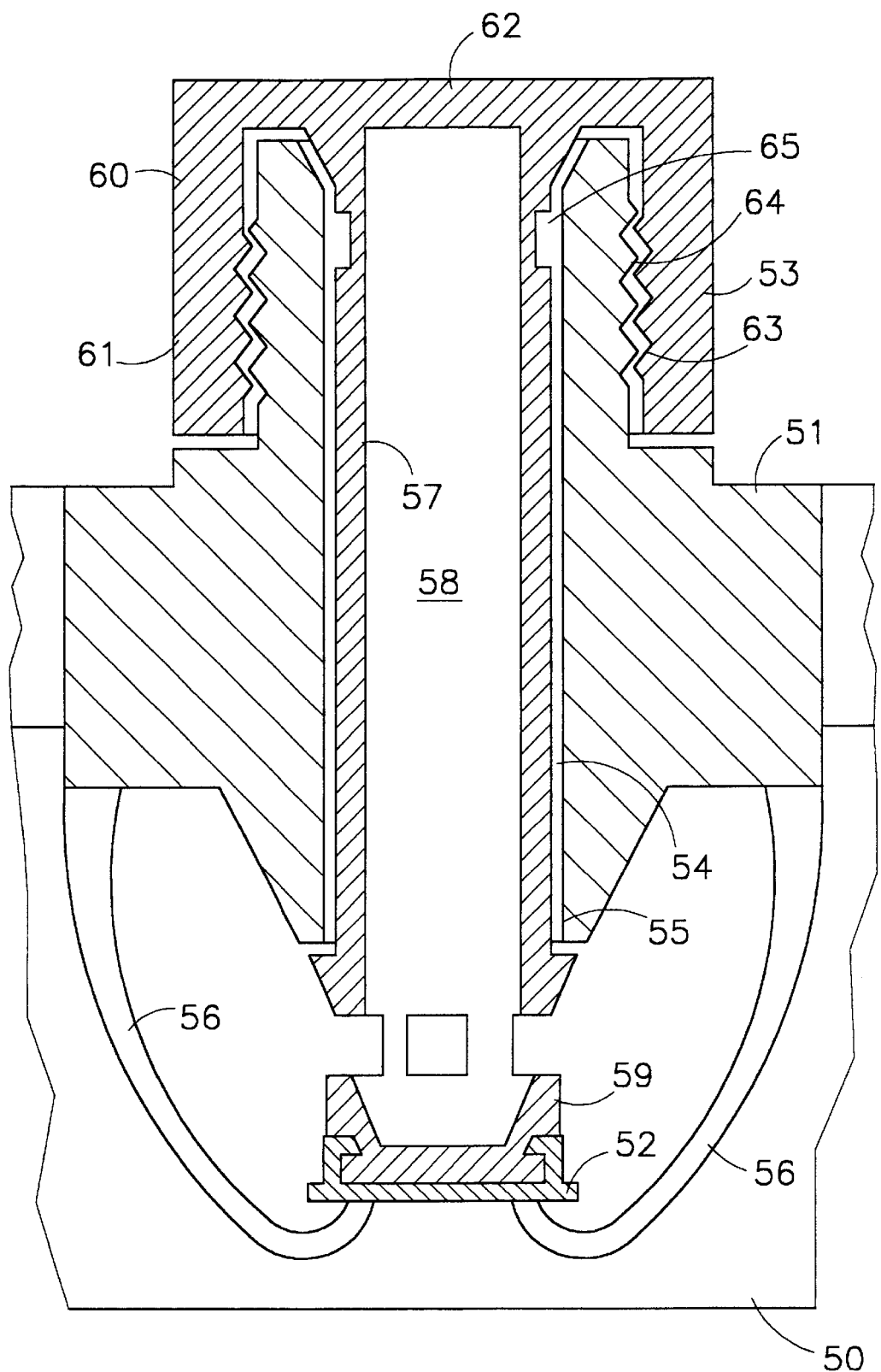
FIG. 3 shows a cross section through part of a third exemplary embodiment of a container according to the invention.

FIG. 3 shows another container with a container body 50, for example a bag made from plastic film, and an assembly for providing a closable communication with the interior of the bag.

The assembly is broadly identical to the assembly described above, and only the significant differences will be explained here.

The assembly comprises a female element 51 with a body which is fixed in the bag, a plug 52 and a male element 53. The body 51 is provided with bore 54, and the plug 52 fits into seat 55 of the body 51 so as to form a seal. The plug 52 is movably connected to the body 51, in this example via arms 56.

The male element 53 has a tubular part 57 with a passage 58 extending through the tubular part 57.

The male element 53 furthermore has a head 59. This head 59 and the plug 52 are designed in such a manner that the plug 52 can be coupled to the head 59, as shown in FIG. 3.

A frangible cap 60 is situated on the outer end of the male element 53. The cap 60 has an annular wall 61 and an end wall 62. The inside of the annular wall 61 is provided with screw thread means 63, which interact with screw thread means 64 formed on the body 51. The screw thread means are preferably designed in such a manner that they can be made to engage together by pressing the cap 60 onto the body 53. The screw thread means may be such that one or more complete turns are required in order to unscrew the cap 60 from the body 53, but there may also be a type of bayonet catch, in which half a turn or so is sufficient. The tubular part 57 adjoins the end face 62 of the cap 60. In the vicinity of the said end face 62, an annular section 65 with a thinner wall is provided in the said tubular part 57, which annular section 65 forms a frangible wall.

In the vicinity of the head 59, and at any rate on that side of the frangible wall 65 which is remote from the cap 60, the male element 53 is provided with hook members 66, which hook securely onto the body 53 when the male element is pushed sufficiently far into the body 53 for the plug 52 to be pressed out of its seat.

The container 50 may be filled with a medium, since the cap 60 closes off the container. If it is desired to dispense the contents from the container, the wall 65 can be broken by turning the cap 60, and thus the cap 60 can be unscrewed from the container. By screwing the cap 60 back onto the container, the container can be closed again at any desired time.

It should be noted that in this embodiment it is not essential for the plug to be coupled to the male element. It is coupled thereto in particular in order to prevent the plug 52 from blocking the entry to the axial passage 58, thus interfering with the dispensing of medium from the container.

Figure 4:
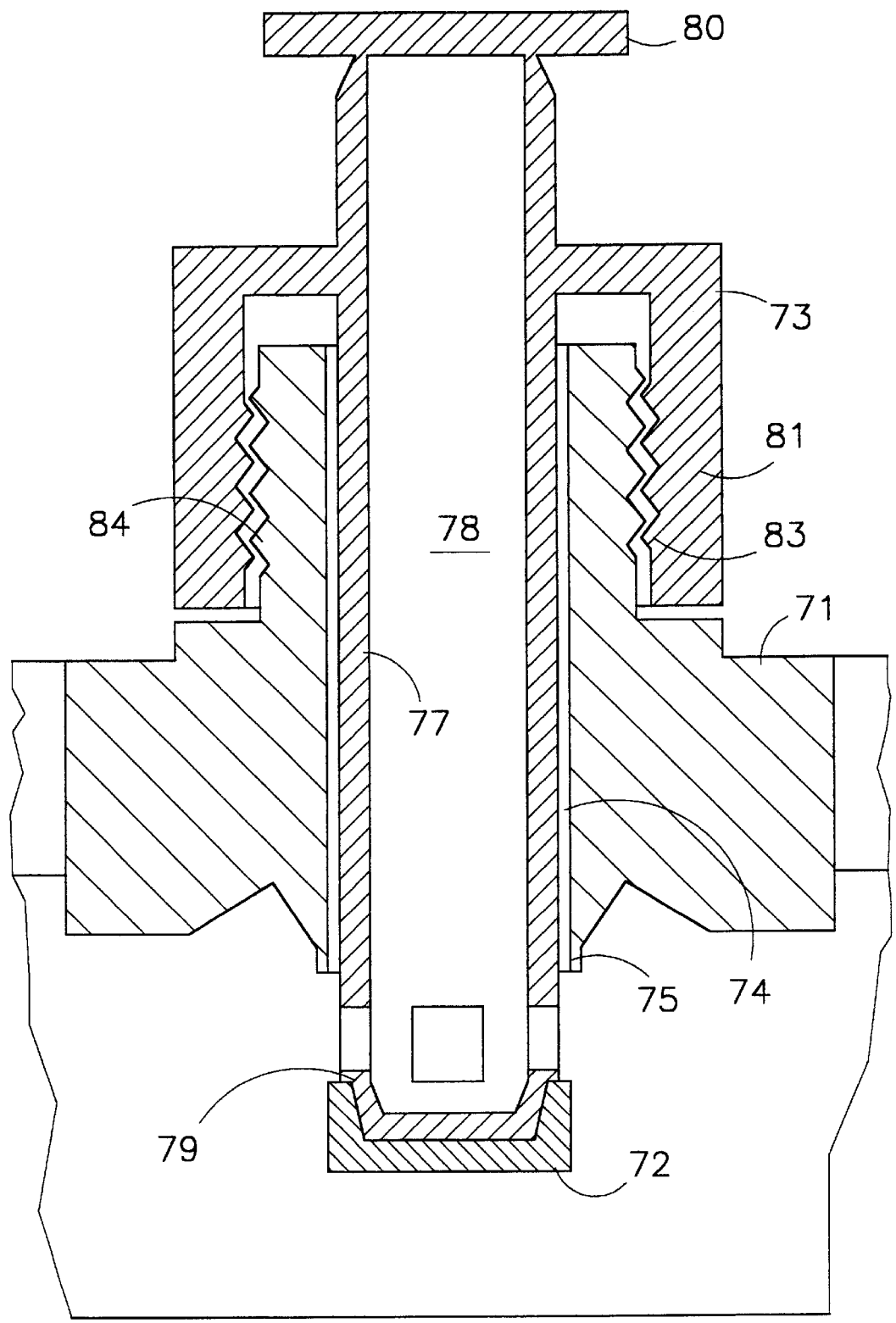
FIG. 4 shows a cross section through part of a fourth exemplary embodiment of a container according to the invention.

FIG. 4 shows a further variant of the container according to the invention, having a container body 70, for example a bag made from plastic film, and an assembly for providing a closable communication with the interior of the bag.

The assembly comprises a female element 71 with a body fixed in the bag, a plug 72 and a male element 73. The body 71 is provided with bore 74, and the plug 72 fits into seat 75 of a body 71 so as to form a seal.

The male element 73 has a tubular part 77 with a passage 78 which extends through the tubular part 77.

The male element 73 furthermore has a head 79. This head 79 and the plug 72 are designed in such a manner that the plug 72 can be coupled to the head 79, as shown in FIG. 4.

A frangible cap 80 is situated on the outer end of the male element 73.

Furthermore, the male element 73 has an annular wall 81 which is moulded firmly on. The inside of the annular wall 81 is provided with screw thread means 83, which interact with screw thread means 84 formed on the body 71.

The screw thread means 83, 84 are such that the male element 73 can be held in a first position, in which the plug 72 is lying in its seat 75 and may be coupled to the head 79. Then, by rotation of the male element 73, it is possible to bring about an axial movement into the second position which is shown and in which the plug 72 has moved out of its seat 75. Obviously, the cap 80 has to be broken off in order to be able to dispense the contents from the container. It is now possible for the container to be closed again by rotation of the male element 73, in such a manner that the plug 72 moves back into the seat 75.

It can be seen from FIG. 4 that the male element 73 is provided with an internal screw thread and the body 71 of the female element is provided with a raised cylindrical collar with external screw thread 84. It will be clear that the opposite is also possible, in which case the male element is provided with an external screw thread, for example the tubular part 77, while the surrounding collar of the female element is provided with an internal screw thread. An actuating projection could be provided for rotation of the male element 73. It will be clear that the screw thread, which in this case has a plurality of screw thread turns, may also be such that the desired axial displacement of the male element is obtained by rotating the male element through only half a turn or so. It is also possible to provide a childproof protection which prevents children from being able to open the container.

As an alternative to the integrally moulded cap 80, it would also be possible to position a tear-off or pierce-through film or foil seal over the opening of the male element 73.

Figure 5A:
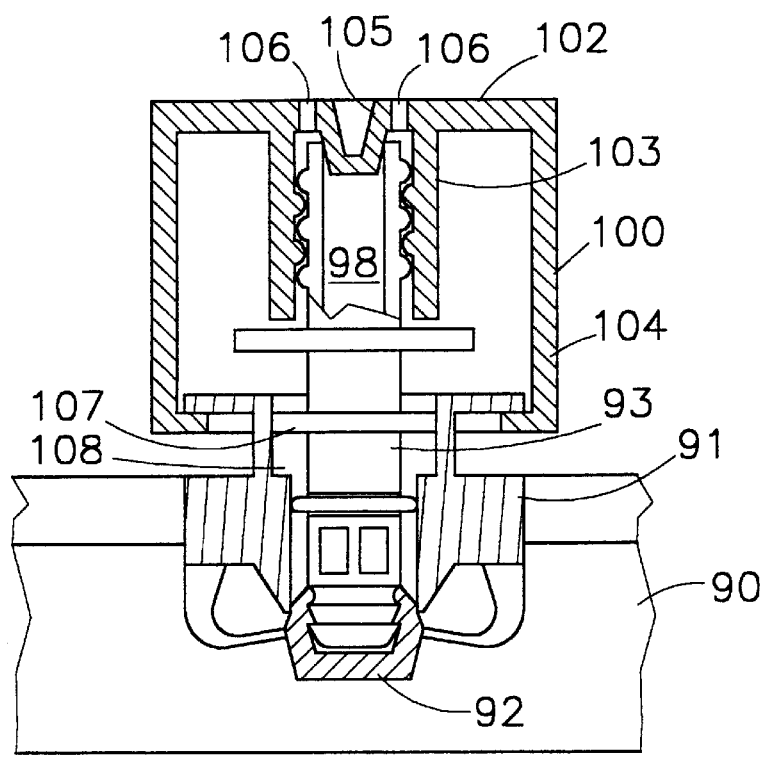
FIGS. 5a and 5b show part of a fifth exemplary embodiment of a container according to the invention, in the closed and open positions respectively.
Figure 5B:
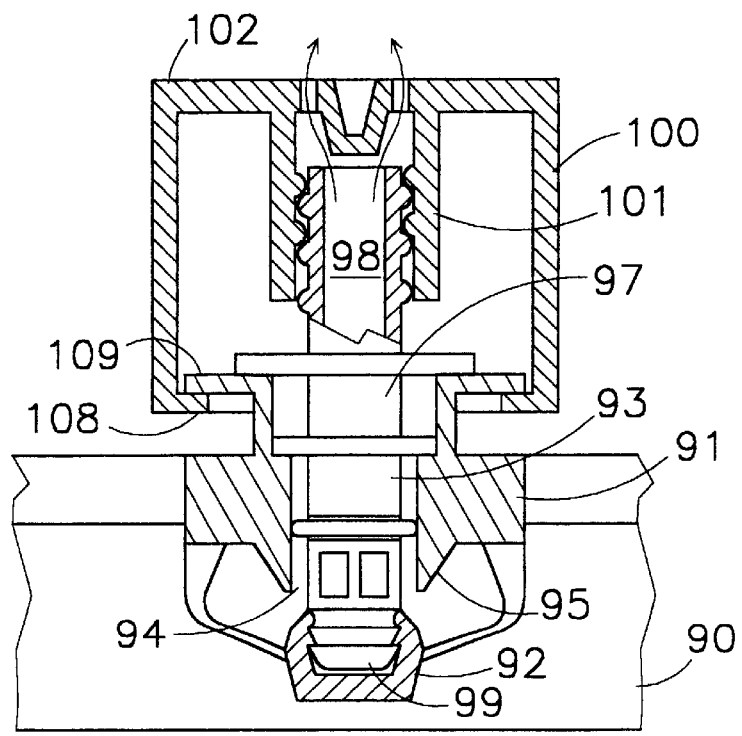

FIGS. 5a and 5b show a section of a container according to the invention, in the closed and open positions respectively. The container has a container body 70, for example a bag made from plastic film, and an assembly for providing a closable communication with the interior of the bag.

The assembly comprises a female element 91 with a body fixed in the bag, a plug 92 and a male element 93. The body 91 is provided with bore 94, and the plug 92 fits into seat 95 of the body 91 so as to form a seal.

The male element 93 has a tubular part 97 with a passage 98 extending through the tubular part 97. The male element 93 furthermore has a head 99. This head 99 and the plug 92 are designed in such a manner that the plug 92 can be coupled to the head 99, as shown in FIGS. 5a, 5b.

The male element 93 is assigned a screw cap 100 which is connected to the tubular part 97 of the male element 93 via associated screw thread means 101. The screw cap 100 has an end wall 102, an inner annular wall 103, which is provided with the screw thread means 101, and an outer annular wall 104. The tubular part 97 fits into the inner annular wall 103. A projection 105, which fits into the passage 98 and is able to close off passage 98, is moulded onto the inside of the end wall 102. Furthermore, there are also passage openings 106, along which the contents can flow out of the container when the screw cap 100 has been rotated into a suitable position (cf. FIG. 5b). A locking projection 107 on the tubular part 97, which is otherwise cylindrical, latches into an associated locking recess 108 in the body 91, thus preventing the male element from being able to rotate with respect to the body 91.

The screw cap 100 in this case forms the coupling means which secure the male element so that it cannot be pulled out of the bore in the body. For this purpose, the outer annular wall 104 is provided with a click-fit rim 108 or the like, which engages behind a rim 109 of the body 91. The way in which the assembly functions can be seen clearly from FIGS. 5a and 5b.

In an embodiment which is advantageous from the manufacturing technology viewpoint, the present invention provides for male elements of various designs each to have a uniform section in the area of the head which interacts with the plug and their own particular part on the other side, in fact the side which projects out of the container.

Figure 6A:
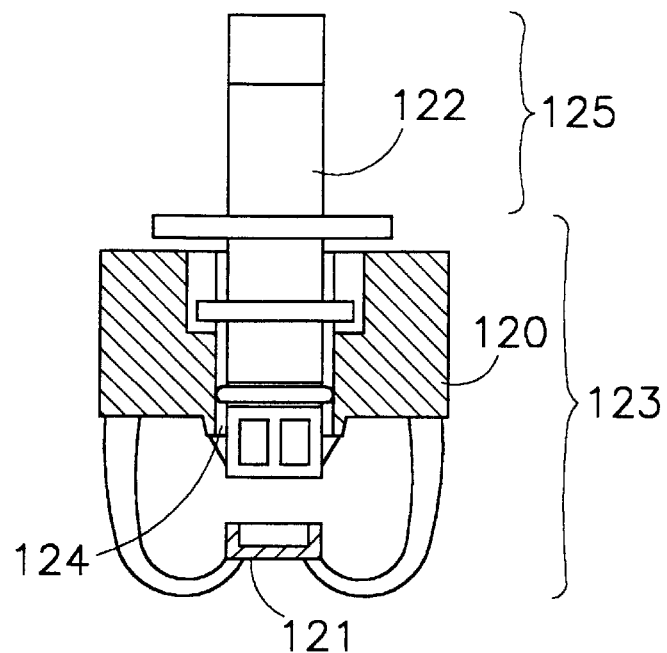
FIGS. 6a–d show exemplary embodiments of the male element.

FIG. 6a shows a section of an assembly having a female element 120, a plug 121 and a section of a male element 122.

Figure 6B:
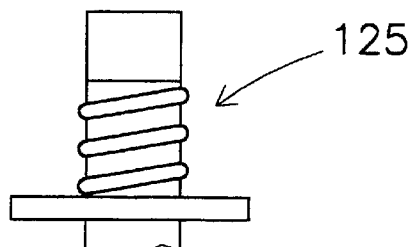
Figure 6C:
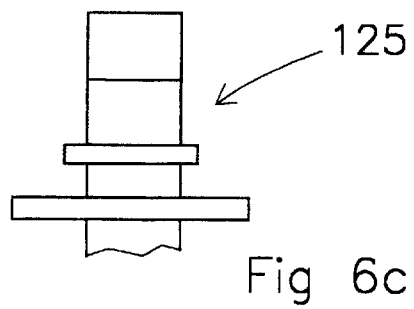
Figure 6D:
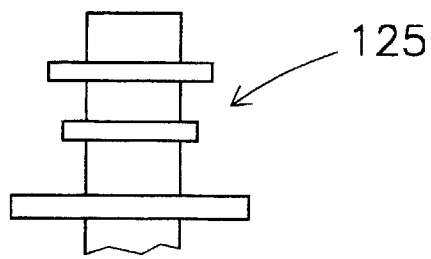

The part 123 of the male element 122 is intended to fit into bore 124 in the body 120. The invention furthermore provides for the part 123 which fits into the bore to be manufactured using a first injection mould part and for exchangeable injection mould parts to fit into the said first injection mould part, in order to form the other part 125 of the male element. FIGS. 6b, c, d show possible embodiments of the said part 125.

Figure 7B:
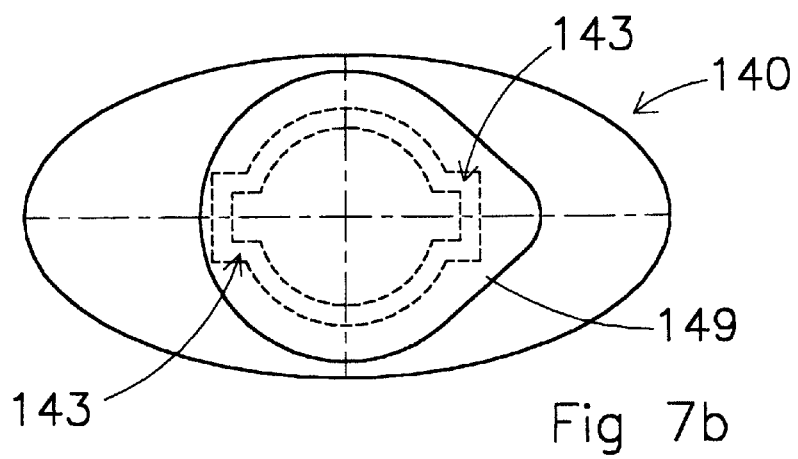
FIGS. 7a–c respectively show perspective, top and cross-sectional views of an exemplary embodiment of a male element.
Figure 7C:
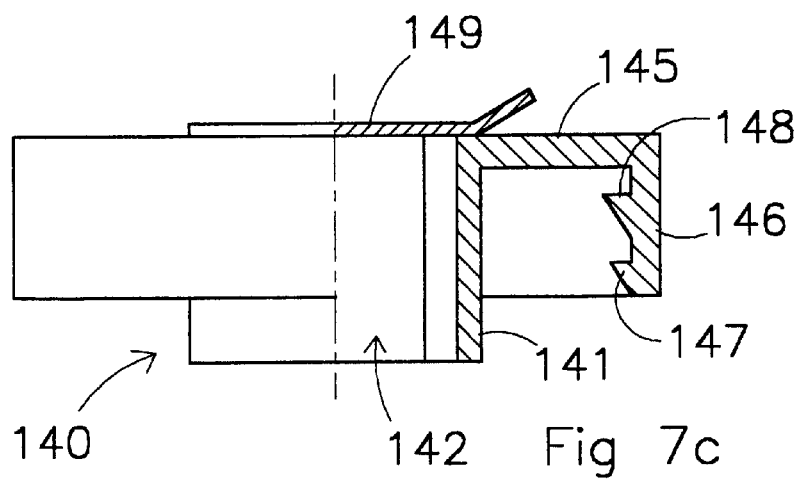
Figure 7A:
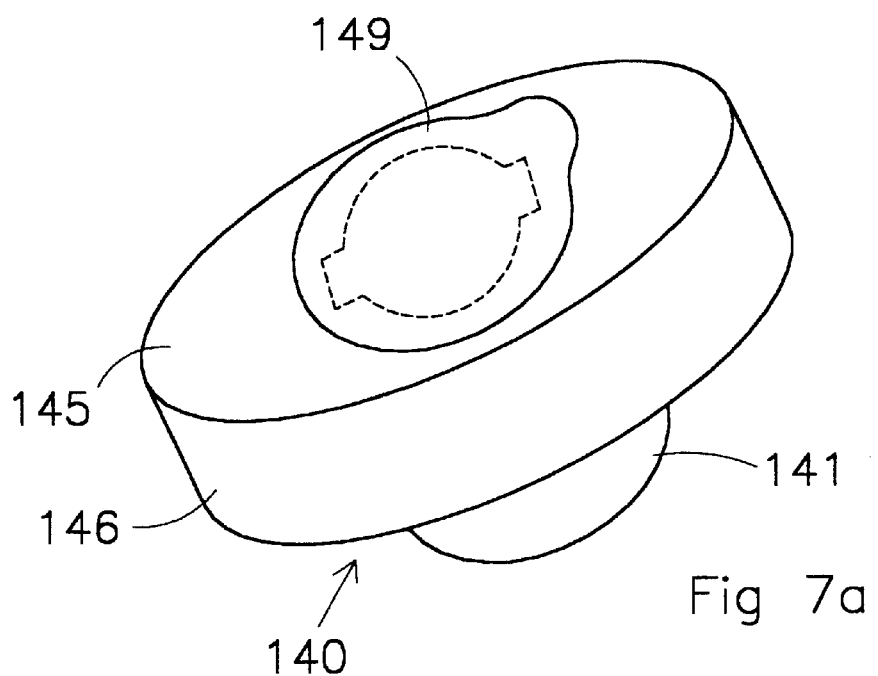

FIGS. 7a–c show a male element 140 which can be used, for example, as an alternative to the male element 3 shown in FIGS. 1a–c.

The male element 140 has a tubular part 141 which fits into an axial bore in the associated female element and is provided with a passage 142 which extends through the tubular part. The cross section of the tubular part 141 is not exactly in the form of a cylinder, but rather is provided with locking formations 143 which fit into corresponding locking recesses in the female element.

A radially oriented annular wall 144 is moulded onto the tubular part at a distance from that side of the male element 140 which is fitted into the bore. On the outer circumference of the said annular wall 145, there is a downwardly directed collar wall 146. The internal circumference of the collar wall 146 is provided with a first click-fit formation 147 and a second click-fit formation 148. Depending on the axial position in the bore of the female element, one of these click-fit formations 147 and 148 of the male element 140 engages on a click-fit formation on the female element. In this case, the first click-fit formation forms an easily detachable connection, while the second click-fit formation 148 forms a connection which is difficult or impossible to detach.

That opening of the passage 142 in the male element 140 which is remote from the insertion side is covered by a closure means which can be removed but cannot be replaced, in this case a tear-off film or foil seal 149 or the like, which is welded or adhesively bonded to the end wall. This provides what is known as a tamper-evident function.

It will be clear that this male element 140 is easy to produce and presents few or no criteria which are critical for the operation of the container. There may be provision for the colour of the male element to be related to the contents of the container.

The male element 140 can be used for the aseptic filling process described above, but can also be used for containers in which sterile conditions are not important.

In a variant which is not shown, the male element of the assembly may be provided with a non-return valve which closes in the direction of the interior of the container, in particular with a duck-bill valve. This design is particularly suitable in combination with a container with a flexible wall. The non-return valve can prevent air from being sucked into the container after filling medium has been dispensed from the container. In the case of a flexible wall, this tendency to suck air back in will be particularly low, so that a simple flap may be sufficient. This is of interest primarily for materials which oxidize, such as for example cleaning liquid for contact lenses and hair dye.

Figure 8A:
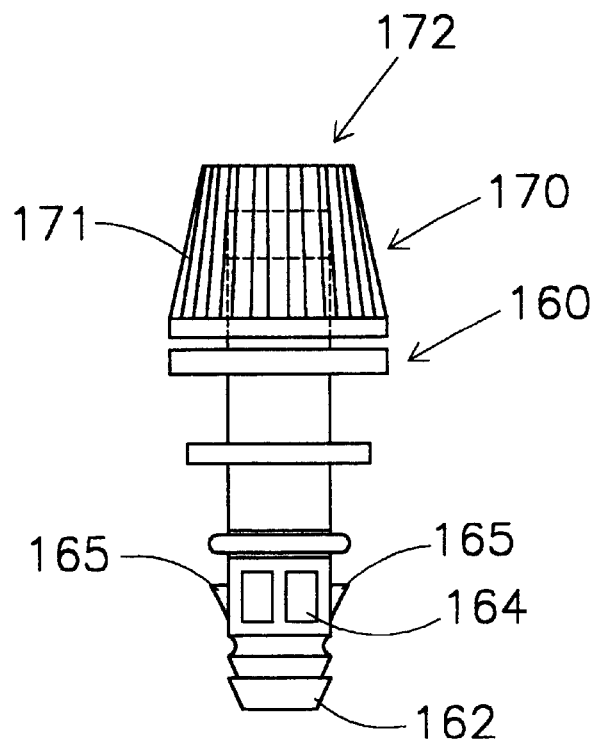
FIG. 8a shows an exemplary embodiment of the male element.
Figures 8B, 8C:
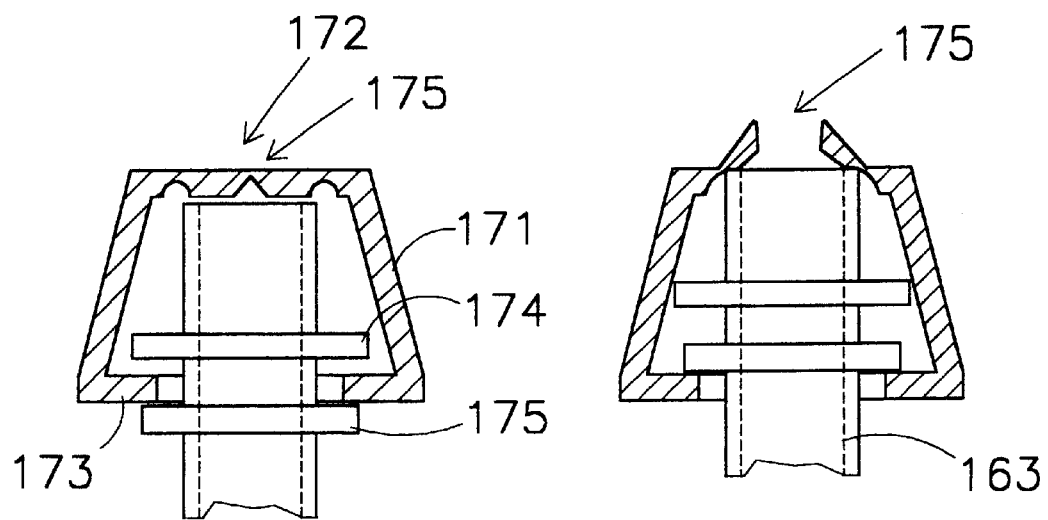
FIGS. 8b, 8c show cross sections through part of the male element from FIG. 8a, respectively in the closed and open positions.

FIGS. 8a–c show a male element 160 with a tubular part 161 which can be fitted into the bore in a female element. At its end, the tubular part 161 is provided with a head 162, by means of which the male element can be coupled to a plug which rests in the bore. The male element 160 has an internal passage 163 with associated openings 164 in the wall of the tubular part 161, immediately behind the head 162. At this location, hook members 165 are also formed on the tubular part, by means of which hook members the male element 160 can be hooked securely onto the female element in a position in which the plug has been pressed out of its seat.

At is end which is remote from the head 162, a cap 170 is positioned on the male element 160. The cap 170 has an annular wall 171 and an end wall 172. Click-fit fingers or a click-fit rim 173 are formed on the inside of the annular wall 171. Two rims, which interact with the click-fit rim 173, are provided on the tubular part. If the rim 173 is lying between the rims 174 and 175, the end wall 172 bears against the end of the tubular part. If the cap is moved in such a way that the click-fit rim 173 engages behind the rim 175, the tubular part deforms the end wall 172 in such a manner that it opens.

For this purpose, a slit 175 is made in the end wall 172, which slit acts as a type of valve. If, in the position shown in FIG. 8b, the cap is sucked or the container is pressed, the contents will move out of the container through the slit 175. In the position shown in FIG. 8c, however, the slit 175 is permanently open until the cap is moved back into the position shown in FIG. 8b. The cap 170 is preferably made from an elastic polymer which allows this movement to be carried out a number of times.

FIGS. 9a–d show, completely or in part, an assembly 200 according to the invention for providing a closable communication with a container body. The container body is in this case preferably designed as a plastic film bag. Preferably, the bag is filled with a beverage, preferably a carbon-dioxide-containing beverage.

The assembly 200 comprises a female element with a relatively rigid plastic body 201 which is produced, for example, by injection-moulding, is shown in detail in FIG. 9b and is intended to be welded securely into a rim of the plastic bag. The assembly 200 also comprises a plug 202 which is connected, in this case via flexible arms 203, to the body 201. In particular, the body 201, the plug 202 and the arms 203 form an integral component obtained by injection-moulding.

The body 201 has an annular wall 220 in the centre, which wall 220 delimits an axial bore 204 which extends through the body 201 from an insertion opening for the male element 206, which is yet to be described in more detail, on the outside to a seat 207, which extends around the bore 204, for the plug 202 in the interior of the bag.

When the plug 202 rests in the seat 207, bore 204 is closed off from the interior of the bag.

The body 201 also has a number of ribs 221 extending around the wall 220, which ribs 221 lie at an axial distance from one another and continue as bridge parts 222 projecting diametrally from the wall 220. These bridge parts 222 taper towards their free end, where they adjoin thin-walled lips 223. When the body 201 is being welded into the seam of a bag made from plastic film, the weld joint is formed in the region of the lips 223 and the intervening bridge parts 222 and ribs 221.

The body 201 is also provided with a top annular transverse wall 225 and a bottom annular transverse wall 206, which are formed around the wall 220 in its part which lies outside the bag. The transverse rims 225, 226 in this case have an oval outer circumference.

The male element 206 has a tubular part 210 which fits into the axial bore 204 and is provided with a passage 211. Projections 212 are formed on the male element 206 at the end which is to be fitted into the bore 204, which projections are able to interact with the plug 202 in order to press it out of its seat 207. The projections 212 are in this case designed to act on the plug 202, in particular on the circumferential edge of the plug 202, at diametrically opposite locations. In the process, the projections 212 engage on the plug 202 in such a manner that the latter is held in position in the lateral direction. In the axial direction however, there is no connection created between the projections 212 and the plug 202, so that the plug 202, once it has been pressed out of its seat 207, can no longer be returned to its seat 207 by moving the male element 206 outwards.

FIGS. 9a, 9c and 9d show the male element 206 in its second axial position with respect to the body 201. In this second position, the plug 202 is pressed off its seat 207. The stress in the arms 203 holds the plug 202 against the projections 212. It can also be seen that the tubular part 210 fits into the seat 207, forming a seal.

The male element 206 comprises an oval collar wall 217, which collar wall 217 is connected to the tubular part 210 via an annular transverse wall 218. The collar wall 217 slides over the transverse walls 225 and 226 of the body 201, as shown in FIG. 9d.

At the outer end of the male element 206 there are closure means 230 of the same type as those used in water bottles, as well as a covering cap 232 which is fixed by a removable blocking ring 231.

At that end of the axial part 210 which lies outside the bag, there is a tubular end part 233 with a smaller external diameter which is closed off by an end wall 234. In the gap between the end part 233 and the axial part 210 there are bridge parts 235, in this example four such parts, which integrally connect the end part 233 to the axial part 210. Between the bridge parts 235 there are through passages (not shown in the drawing) which open out in an annular gap 236 between the end part 233 and the axial part 210.

A closure cap 240 which can move up and down fits over the outside of the tubular part 210. The closure cap 240 has an annular wall 241 which lies around the outside of the axial part 210, an end wall 242 with a central opening into which the end part 233 fits, forming a seal, and an inner annular wall 243 which, in the closed position of the cap 240, bears against the inside of the axial part 210.

A stop rib 246 and 245 is formed on the outer circumference of the axial part 210 and on the inner circumference of the annular wall 241, respectively, which stop ribs 245 and 246, when the cap 240 is pulled out, limit the displacement of the cap 240 with respect to the axial part 210, so that the cap 240 does not come off the said axial part 210.

In the closed position of the cap 240, the ribs 245, 246 also form a seal. Furthermore, the contact of the circumferential rim around the opening in the end wall 242 and the end part 233 forms a seal, and an additional seal is created by the contact between the inner annular wall 243 and the inside of the axial tube part 210.

To make it possible to guarantee the reliability of the product which is to be supplied to the consumer, the covering cap 232 is provided, which is placed over the closure cap 240 and, via the ring 231 which can be broken or removed by the consumer, is fixed to the stepped annular wall 216 of the axial part 210.

It will be clear that it is necessary to prevent consumer, when he is pulling the closure cap 240 out, from also pulling the male element 206 out of the body 201, since in that case the contents of the bag would be able to emerge from the bag via the axial bore 204 without being impeded.

The invention also provides for the male element 206, on the one hand, and the body 201, on the other hand, to be provided with interacting coupling means which, in the second position of the male element described, prevent the male element 206 from being pulled out of the body 210. By way of example, it is possible to provide one or more hook members, such as the hook members 46 which were explained with reference to FIG. 2. As an alternative, or in combination with this measure, it is possible to provide a hook connection between one or both transverse walls 225, 226, on the one hand, and the collar wall 217, as has already been explained with reference to FIGS. 1a, 2.

In one possible design, the bag provided with the assembly 200 is supplied to the consumer with the male element 206 in its first axial position, in which the plug 202 is in its seat 207 and the interior of the container is closed off by the plug 202. The consumer can then press the male element 206 further into the female element 201, so that the plug 202 comes out of the seat 207. Then, the consumer can remove the covering cap 232, and then pull out the closure cap 240, after which the beverage or the like can be dispensed from the bag.

However, it is also conceivable for the bag to be delivered to the consumer in a state in which the male element 206 is already in the second position and the plug 202 has therefore already been pressed off the seat 207. The plug 202 is therefore no longer important, but may have been useful during the (aseptic) filling of the bag, in particular in the period between the filling of the bag and the positioning of the male element 206 in the bore 204 of the body 201.

In an embodiment which is not shown, the assembly 200 in accordance with FIGS. 9a–d is also suitable for positioning in a (plastic) bottle or can, for example on the neck of a bottle of this nature, which is provided with an external screwthread or other profiling. In particular, the invention provides for the use of the relevant assembly for a bottle which is filled with a carbon-dioxide-containing beverage, for example a cold beverage. In this way, the invention provides for the use of an assembly of this nature for a container in which there is another filling medium under (gas) pressure.

Particularly for producers of carbon-dioxide-containing beverages, there has already, for some considerable time, been a need for a different type of closure for the bottles from the screw cap which has been used hitherto. The replacement of a screw cap by a cap of the water-bottle type, which is known per se, or some other type of known push-pull cap in which the movable cap part has to be pulled outwards in order to open the bottle has encountered the problem that the pressure of the carbon dioxide acts on the movable cap part and seeks to open the cap. This entails the risk of undesired leakage of the carbon dioxide from the bottle, particularly if the filled bottle is stored for a relatively long period before its content is used.

The above problem does not occur with the assembly 200 explained with reference to FIGS. 9a–d, because as long as the bottle remains unopened by the consumer the plug 202 rests in its seat 207. The pressure of the carbon dioxide only pushes the plug 202 more firmly into this seat 207. Furthermore, the cap 240 forms a second, additional closure of the bottle. After a bottle which is provided with an assembly of the type such as the assembly 200 has been opened by the consumer, the bottle can then only be closed by means of the cap 240. In the closed position, this cap 240 clamps sufficiently strongly onto the tubular part 210 to withstand the gas pressure; if appropriate, a separate click-fit connection is provided between the cap 240 and the tubular part 210 in order to hold the cap 240 in its closed position. As has been discussed, the cap 240 provides a seal at a plurality of locations with respect to the tubular part 210, so that leakage of carbon dioxide is prevented.

It will be clear that the idea described here can also be produced, for example, using the assembly which is described with reference to FIGS. 5a, 5b and also with the aid of the assembly which is to be described with reference to FIGS. 10a–c.

Figure 10B:
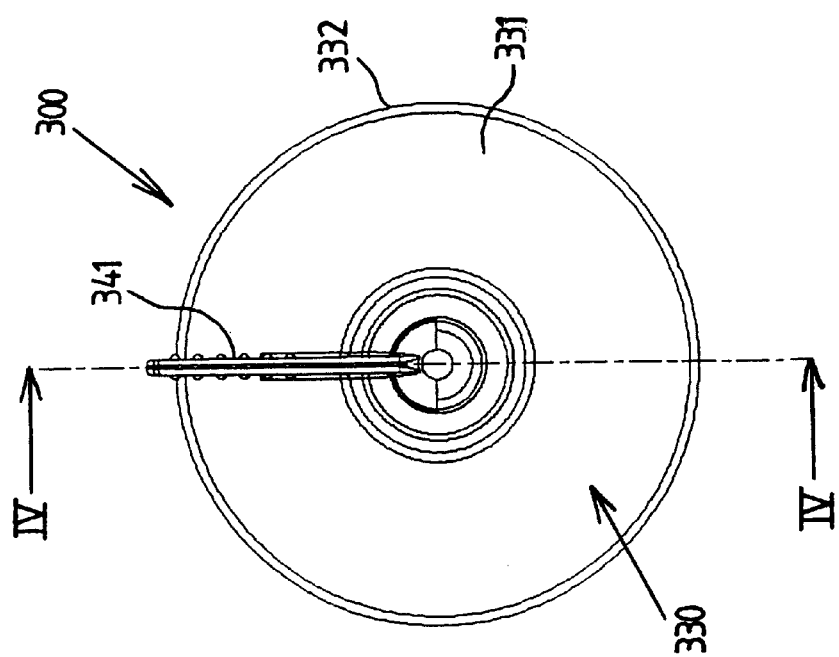
Figure 10A:
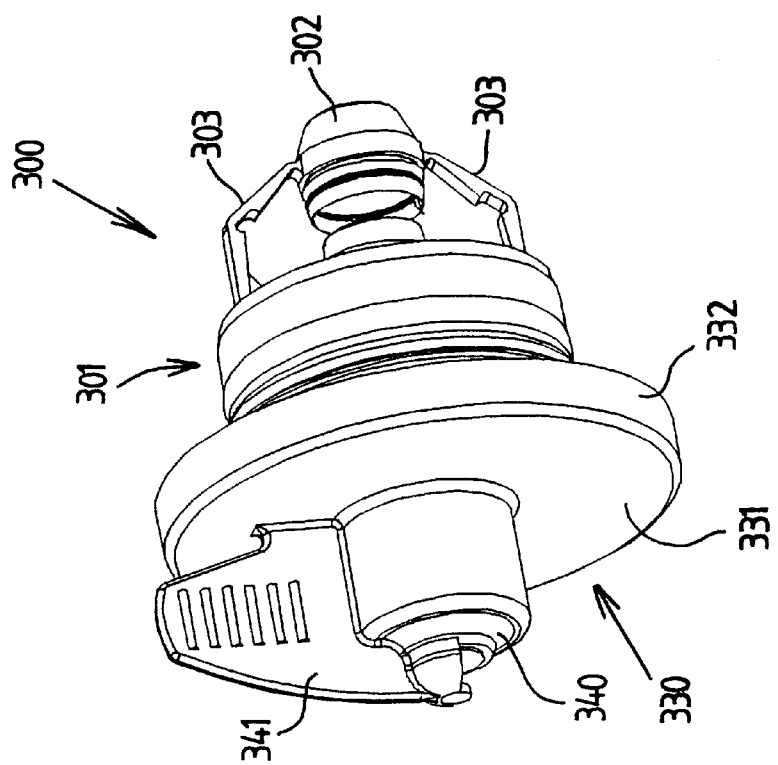
FIG. 10a shows a perspective view of yet another assembly according to the invention for providing a closable communication with a container body.
Figure 10C:
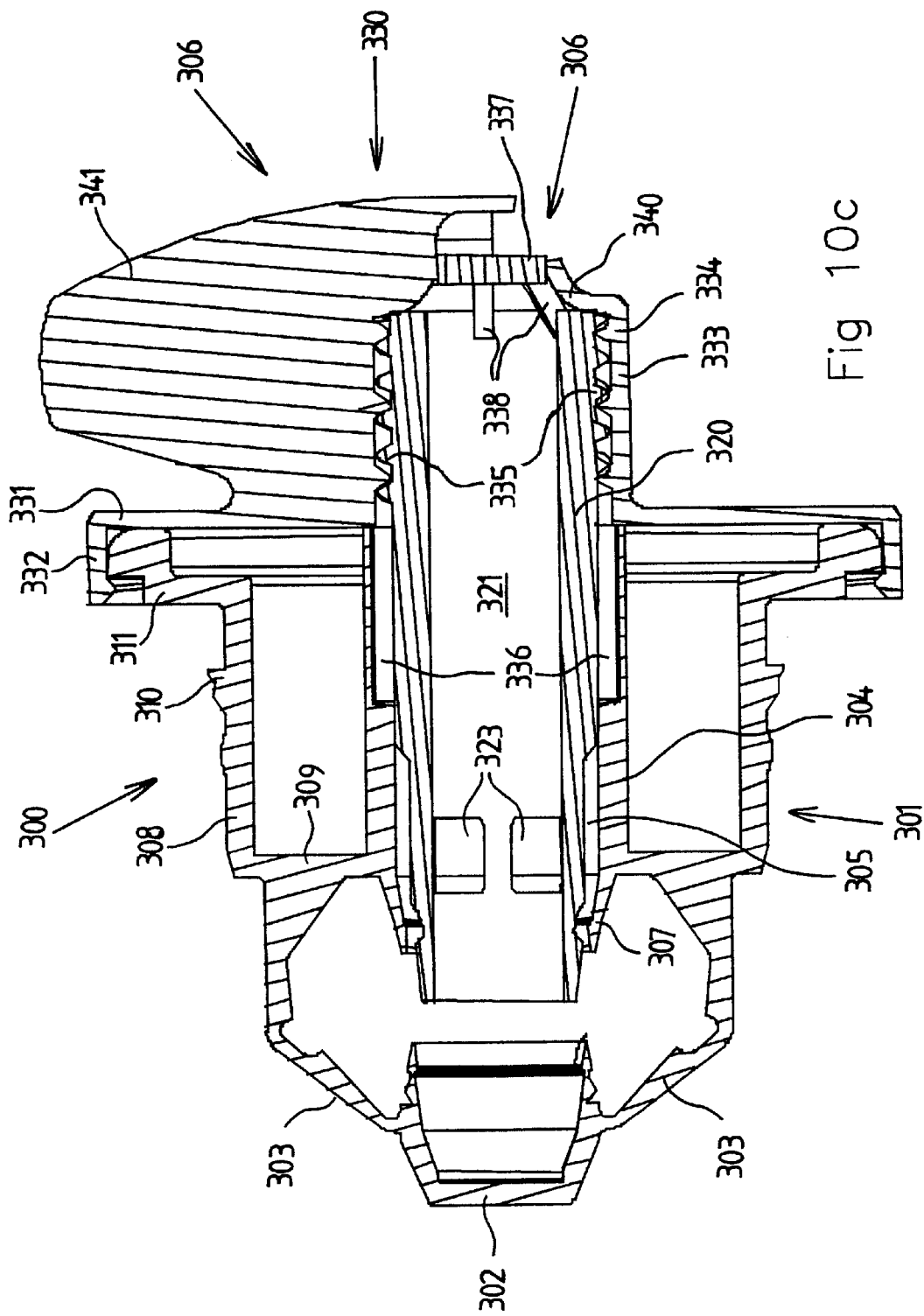
FIG. 10c shows a cross section on line IV—IV from FIG. 10b.

FIGS. 10a, 10b and 10c show an assembly 300 according to the invention for providing a closable connection to a container body (not shown in more detail), for example a bag of a so-called bag-in-box system.

The assembly 300 comprises a female element with a relatively rigid plastic body 301 which is produced, for example, by injection moulding and is intended to be click-fitted securely into a receiving component, which is not shown and is in turn fixed in a bag, for example by welding. The assembly 300 also comprises a plug 302 which is integrally connected to the body 301, in this case via flexible arms 303.

The body 301 has an inner annular wall 304 in the centre, which wall 304 delimits an axial bore 305 which extends through the body 301 from an insertion opening for the male element 306, which is to be described in more detail below, on the outside to a seat 307 for the plug 302, which extends around the bore 305.

When the plug 302 is resting in the seat 307, the bore 305 is closed off from the interior of the bag.

The body 301 also has an outer annular wall 308 which lies at a radial distance from the wall 304 and is connected thereto via an annular transverse wall 309. One or more click-fit rims 310, by means of which the body 301 can be fixed in the abovementioned receiving component, are formed on the outer circumference of the wall 308.

The body 301 is also provided with a top annular transverse wall 311, which is formed on the outwardly facing end of the wall 308 and projects outwards with respect to the said wall 308. The transverse wall 311 has a circular outer circumference.

The male element 306 has a tubular part 320 which fits into the axial bore 305 and is provided with an axial passage 321 extending over its length. At the end which is to be fitted into the bore 305, a circumferential rim 322, which can be coupled to the plug 302 as explained above with reference to FIGS. 3, 5a, 5b, is formed on the male element 306. This coupling between the male element 306 and the plug 302 is constantly present once the male element 306 has been put in position. In FIGS. 10a, 10c, the plug 302 has been removed from the male element 306, purely for the sake of clarity of the drawing. In the following description, the plug 302 and the male element 306 are considered to be coupled to one another.

FIGS. 10a–c show the male element 306 in its first axial position with respect to the body 301. In this first position, the plug 302 rests in its seat 307, and the bag is closed off by the plug 302.

The male element 306 can be displaced into an associated second axial position in which the plug 302 is clear of the seat 306 but still coupled to the end of the male element 306. Via openings 323 in the tubular body 320, the bag is then in communication with the passage 321.

To displace the male element 306 between its first and second axial positions, a rotatable tap handle 330 is provided, which tap handle 330 also serves as an actuable closure means for closing off the male element 306 at the outer end.

The tap handle 330 comprises an annular transverse wall 331 which is provided with a circular click-fit rim 332, which engages around the transverse wall 311 of the body 301. This click-fit connection locks the tap handle 330 in the axial direction with respect to the body 301 and also secures the tap handle 330 to the said body 301 in such a manner that it can rotate about the axial axis.

The tap handle 330 also comprises an annular wall 333 which, on the inside, forms an opening provided with a type of internal screwthread 334. The tubular body 320 fits into the said opening, where it is provided with a type of external screwthread which engages with the internal screwthread of the tap handle 330. In particular, the tubular body 320 is provided on its outside with one or more axial ribs 335 with a toothing, which ribs 335 form a type of rack. The inner wall 304 of the body 301 is provided, for each of the ribs 335, with interaction between the ribs 335 and the associated grooves 336, preventing the male element 306 being able to rotate in the bore 305.

An end wall 337, which is connected to the said tubular body 320 via bridge parts 338, is arranged at the outer end of the tubular body 320. There are openings between the bridge parts 338.

At the outer end of the annular wall 333, the tap handle 330 is provided with an end wall 340 in which there is an opening into which the end wall 337 of the male element 306 fits, forming a seal, when the male element 306 is in its first axial position (cf. FIG. 10c).

Finally, the tap handle 330 also comprises a grip 341. The entire tap handle 330 is preferably an integral plastic component which is obtained by injection moulding.

The assembly 300 operates as follows.

In the first axial position of the male element 306, the plug 302 has already been click-fitted securely onto the male element 306 and rests in its seat 307, forming a seal. Furthermore, the end wall 340 adjoins the end wall 337, forming a seal, so that the male element 306 is also closed off at this outer end. As a result of the tap handle 330 then being turned, the male element 306 slides inwards and the plug 302 is pressed out of its seat. The opening in the end wall 340 is also opened, so that communication with the interior of the bag or other container is formed. After the desired quantity has been dispensed from the bag, the handle 330 can be turned back again. In the process, the plug 302 is pulled back into its seat 307 and also closes the opening in the end wall 340.

One possible application of the assembly 300 is, for example, for containers filled with wine or the like.

It will be clear that numerous designs of the closure means of the male element are possible within the scope of the present invention, depending on the intended application. It is also conceivable for the male element to be provided with a metering chamber, from which one metered volume of medium can be dispensed each time. Furthermore, it will be clear that the various aspects of the invention which, for the sake of clarity, have been shown and explained separately may also be used in combination with one another and fall within the scope of the invention.

The invention also provides a method for providing a flexible container which is filled with a filling medium, which container has a container body formed by a flexible wall, in particular made from plastic film. The container referred to here also has a connecting assembly for providing communication with the interior of the container body, for example an assembly as explained above with reference to the drawing. An assembly of this nature comprises a female element which is secured in the wall of the container body, as well as a male element and a plug, the female element having a body which is secured in the wall of the container body with an axial bore which extends through the body, from an insertion opening for the male element on the outside to a seat, which extends around the bore, for the plug in the interior of the container body, which plug serves to close off the bore, the male element having a tubular part which fits into the axial bore, and the male element being provided with a passage which extends through the tubular part, and with a head, which is able to interact with the plug in order to press the latter off its seat.

The invention provides, inter alia, a method which comprises the following steps:
- providing a flexible container body without a connecting assembly accommodated therein, the container body preferably being closed on all sides,
- subjecting the flexible container body to a sterilizing irradiating treatment, for example using gamma radiation,
- placing the flexible container in a clean, preferably sterile, room,
- providing a local opening in the container body and positioning and then fixing the previously sterilized body of the female element of the connecting assembly in this opening,
- filling the container body via the bore in the body of the female element using a filling device which is present in the sterile room, which filling device has a plug-actuating member which can be coupled to the plug,
- and—after the container has been filled—pulling the plug into the seat using the plug-actuating member.

One of the various advantages of the method described above is that flexible container bodies take up little space for as long as there is no connecting assembly fitted. Consequently, a large number of bags which are sealed on all sides can be packed in a box or the like, after which the bags are placed in an irradiation chamber. The result is a considerable saving on the irradiation costs. Furthermore, after the irradiation it is impossible for any further contamination to enter the bags, which are closed on all sides.

Alternatively, it is conceivable for the bags not to be closed on all sides, but rather for an opening, for example an open seam, to be present already, in which opening the body of the female element is subsequently fixed. In that case, these bags may, for example, be packed in a closed envelope and then irradiated. The envelope is then preferably only opened in the clean or sterile room.

If an irradiation treatment is not carried out on the bag, the container body may alternatively, after the flexible container has been placed in a clean, preferably sterile, room, be subjected to a sterilizing heat treatment, for example using steam. Since as yet there has been no connecting assembly placed in the flexible container, this container will still be flat, so that the heat penetrates deeply and has a sterilizing action.

The creation of a local opening in the container body is preferably effected using a cutting device which is sterilized again, for example using steam, each time before or after it has opened a container body.

Preferably, an excess pressure and, for example, a mixture of steam and hydrogen peroxide or the like prevail in the clean room.

Preferably, the body of the female element is sterilized while a storage container in which a stock of female elements is present is being conveyed to the location in the clean room where the female element is placed and fixed in the flexible container.

Preferably, the handling means which handle the female element are also sterilized again, for example using steam, each time they are used to place the female element in the container body.

Preferably, the filling device and, if present, the vacuum-application device, or at least the parts of these devices which come into contact with the container body and/or the connecting assembly, are sterilized again each time after or before they have been used to fill a container.

Preferably, the method also provides for the removal of any residues of the filling medium from the bore in the body of the female element after filling, preferably before the container leaves the clean or sterile room.

Preferably, this method also comprises placing a closure element on the female element, which closure element closes off the bore on the side remote from the bag in order to keep the bore sterile.

What is claimed is:

1. A container with a closable opening, comprising a container body which is formed by a wall, the container having an outside and an interior, the container furthermore comprises an assembly for providing a closable communication with the interior of the container body; the assembly comprises a female element, a male element and a plug; the female element having a body which is secured in the wall of the container body, with an axial bore which extends through the body, from an insertion opening for the male element on the outside to a seat, which extends around the bore, for the plug in the interior of the container body; the plug serves to close the bore when positioned in the seat; the male element has a closure means and a tubular part which fits into the axial bore; the male element is provided with a passage which extends through the tubular part from the closure means to a head which is able to interact with the plug in order to press the plug off the seat, the closure means being provided for closing off the passage; a coupling means is provided for coupling the body of the female element and the male element to one another, the coupling means providing resistance to the male element being pulled outwards out of the bore.

2. A container according to claim 1, in which the coupling means is designed as a click-fit connection means.

3. A container according to claim 1, in which the coupling means define a plurality of axial positions of the male element with respect to the body of the female element, which axial positions comprise a first position, in which the plug is located in its seat and the interior of the container is closed off by the plug, and a second position, in which the plug is held off its seat by the male element and the interior of the container is in communication with the passage in the male element.

4. A container according to claim 1, in which the male element can rotate inside the bore, and in which the coupling means comprise screw thread means which are provided on the body of the female element and on the male element, in such a manner that the male element can be displaced in the axial direction inside the bore by rotation of the male element with respect to the body of the female element.

5. A container according to claim 1, in which the closure means comprises a cap which hermetically seals the axial passage in the male element at its outer end, the cap being connected to the male element via a frangible wall.

6. A container according to claim 1, in which the coupling means define a plurality of axial positions of the male element with respect to the body of the female element, which axial positions comprise a first position, in which the plug is located in its seat and the interior of the container is closed off by the plug, and a second position, in which the plug is held off its seat by the male element and the interior of the container is in communication with the passage in the male element, and in which the coupling means comprise one or more hook members which are formed on the tubular part of the male element and, in the second position of the male element, engage behind an associated stop on the body of the female element.

7. A container according to claim 1, in which the coupling means define a plurality of axial positions of the male element with respect to the body of the female element, which axial positions comprise a first position, in which the plug is located in its seat and the interior of the container is closed off by the plug, and a second position, in which the plug is held off its seat by the male element and the interior of the container is in communication with the passage in the male element, and in which the coupling means comprise one or more hook members which are formed on the tubular part of the male element and, in the second position of the male element, engage behind an associated stop on the body of the female element, and in which the one or more hook members are designed to engage behind the seat of the plug in the second position of the male element.

8. A container according to claim 1, in which the coupling means define a plurality of axial positions of the male element with respect to the body of the female element, which axial positions comprise a first position, in which the plug is located in its seat and the interior of the container is closed off by the plug, and a second position, in which the plug is held off its seat by the male element and the interior of the container is in communication with the passage in the male element, and in which the coupling means provide a considerably greater resistance to the male element being pulled out in the second position of the male element than in the first position.

9. A container according to claim 1, in which the coupling means define a plurality of axial positions of the male element with respect to the body of the female element, which axial positions comprise a first position, in which the plug is located in its seat and the interior of the container is closed off by the plug, and a second position, in which the plug is held off its seat by the male element and the interior of the container is in communication with the passage in the male element, and in which the coupling means provide a considerably greater resistance to the male element being pulled out in the second position of the male element than in the first position, and in which the coupling means provide so much resistance in the second position of the male element that the male element can no longer be pulled out of the bore by hand.

10. A container according to claim 1, in which the plug and the head of the male element are designed in such a manner that the plug can be coupled to the head of the male element.

11. A container according to claim 1, in which the coupling means define a plurality of axial positions of the male element with respect to the body of the female element, which axial positions comprise a first position, in which the plug is located in its seat and the interior of the container is closed off by the plug, and a second position, in which the plug is held off its seat by the male element and the interior of the container is in communication with the passage in the male element, and in which the container is also provided with frangible or removable block-ing means for the male element, which blocking means block movement of the male element from the first position to the second position until the blocking means have been broken or removed.

12. A container according to claim 1, in which the closure means comprise a screw cap which is connected to the tubular part of the male element via associated screw thread means.

13. A container according to claim 1, in which the container body has a flexible wall.

14. A container according to claim 1, in which the container body has a flexible wall, and in which the container body and the female element, as well as the plug, are able to withstand the container being filled with a hot filling medium, for example a filling medium which is at a temperature of 70° C. or higher, and in which the container is preferably also suitable for eating the filled, still closed container.

15. A container according to claim 1, in which the container body has a flexible wall, and in which the container, possibly including the male element, is able to withstand sterilization in an autoclave, for example several hours at a temperature of 130° C.

16. A container according to claim 1, in which the container body is a bottle, for example a plastic bottle, which bottle is filled, for example, with a carbon-dioxide-containing beverage.

17. A connecting assembly for providing a fluid communication, comprising a female element, as well as a male element and a plug according to one or more of the preceding claims.

* * * * *